(12) United States Patent
Seok (10) Patent No.: US 9,634,821 B2
(45) Date of Patent: Apr. 25, 2017

(54) METHOD AND APPARATUS FOR CHANNEL ACCESS IN WLAN SYSTEM

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 13/264,333

(22) PCT Filed: Apr. 14, 2010

(86) PCT No.: PCT/KR2010/002316
§ 371 (c)(1),
(2), (4) Date: Oct. 13, 2011

(87) PCT Pub. No.: WO2010/120119
PCT Pub. Date: Oct. 21, 2010

(65) Prior Publication Data
US 2012/0076091 A1   Mar. 29, 2012

Related U.S. Application Data (60) Provisional application No. 61/169,296, filed on Apr. 14, 2009.

(51) Int. Cl.
| | | |
|---|---|---|
| *H04W 72/02* | (2009.01) | |
| *H04W 72/04* | (2009.01) | |
| *H04W 84/12* | (2009.01) | |
| *H04L 5/00* | (2006.01) | |
| *H04W 74/00* | (2009.01) | |

(52) U.S. Cl.
CPC .......... *H04L 5/0092* (2013.01); *H04L 5/0062* (2013.01); *H04W 74/006* (2013.01); *H04L 5/0023* (2013.01); *H04W 84/12* (2013.01)

(58) Field of Classification Search
USPC ......................... 370/329, 476, 338
See application file for complete search history.

(56) References Cited

U.S. PATENT DOCUMENTS

| | | | |
|---|---|---|---|
| 2005/0183115 A1* | 8/2005 | Maruyama et al. ............ | 725/38 |
| 2005/0208956 A1* | 9/2005 | Takagi .............. | H04W 74/0808 455/464 |
| 2006/0056344 A1* | 3/2006 | Roy et al. ..................... | 370/329 |
| 2006/0280152 A1 | 12/2006 | Lee et al. | |
| 2007/0097867 A1* | 5/2007 | Kneckt et al. ................ | 370/236 |
| 2007/0213012 A1 | 9/2007 | Marin et al. | |
| 2009/0252135 A1* | 10/2009 | Benveniste ................... | 370/338 |

(Continued)

FOREIGN PATENT DOCUMENTS

| | | |
|---|---|---|
| KR | 10-2006-0124593 A | 12/2006 |
| KR | 10-2009-0012774 A | 2/2009 |

*Primary Examiner* — Kevin C Harper
*Assistant Examiner* — Derrick V Rose
(74) *Attorney, Agent, or Firm* — Birch, Stewart, Kolasch & Birch, LLP (57) ABSTRACT

A channel access method in a wireless local area network (WLAN) system using a multi-channel configured by aggregation of a plurality of subchannels is provided. The method includes receiving from an access point (AP) a multi-channel switching request frame for requesting a first station operating in a first subchannel constituting the multi-channel to switch to a second subchannel constituting the multi-channel and transmitting a multi-channel switching response frame for reporting whether to switch to the second subchannel in response to the multi-channel switching request frame.

9 Claims, 8 Drawing Sheets

(56) References Cited

U.S. PATENT DOCUMENTS

2010/0246480 A1\* 9/2010 Aggarwal ............. H04L 45/123
                                                          370/328
2011/0150004 A1\* 6/2011 Denteneer et al. ........... 370/476
2012/0008586 A1\* 1/2012 Kwon et al. .................. 370/329

\* cited by examiner

METHOD AND APPARATUS FOR CHANNEL ACCESS IN WLAN SYSTEM

This application is the National Phase of PCT/KR2010/002316 filed on Apr. 14, 2010, which claims priority under 35 U.S.C. 119(e) to U.S. Provisional Application No. 61/169,296 filed on Apr. 14, 2009, all of which are hereby expressly incorporated by reference into the present application.

TECHNICAL FIELD

The present invention relates to wireless communications, and more particularly, to a method for channel access in a wireless local area network (WLAN) system using a multi-channel and an apparatus for supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of above 1 Gbps. This is because the IEEE 802.11n MAC/PHY protocol is designed for an operation of a station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of above 1 Gbps in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of above 1 Gbps in a MAC service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatially multiplexed data to the plurality of VHT STAs.

The VHT WLAN system requires a channel having a bandwidth of above 80 MHz and 8 or more spatial streams whereas a legacy STA supporting IEEE 802.11a/b/g/n uses a channel having a bandwidth of 20 MHz or 40 MHz. However, it is not easy to ensure a contiguous frequency band of 80 MHz usable in a limited frequency band currently used by various wireless communication systems as well as the conventional legacy WLAN system. To solve such a problem, non-contiguous channels need to be aggregated to be utilized as a radio channel of 80 MHz. Accordingly, there is a need to consider a method for channel access of a plurality of STAs in a WLAN system using an 80 MHz channel obtained by aggregation of non-contiguous frequency bands.

SUMMARY OF INVENTION

Technical Problem

The present invention provides a method for channel access in a wireless local area network (WLAN) system using a multi-channel obtained by aggregation of a plurality of subchannels.

The present invention also provides a wireless apparatus which operates by accessing a channel in a WLAN system using a multi-channel obtained by aggregation of a plurality of subchannels.

Solution to Problem

In an aspect of the present invention, there is provided a channel access method in a wireless local area network (WLAN) system using a multi-channel configured by aggregation of a plurality of subchannels. The method includes receiving from an access point (AP) a multi-channel switching request frame for requesting a first station operating in a first subchannel constituting the multi-channel to switch to a second subchannel constituting the multi-channel and transmitting a multi-channel switching response frame for reporting whether to switch to the second subchannel in response to the multi-channel switching request frame.

The multi-channel switching response frame may further include information indicating a timeout by which the first station switches to the second subchannel.

The first subchannel may be a subchannel allocated with a receive chain dedicated for receiving a frame by the AP from one or more stations operating in the first subchannel, and the second subchannel may be a subchannel allocated with a transmit chain dedicated for transmitting a frame by the AP to one or more stations operating in the second subchannel.

The frame transmission of the AP may be asymmetric to frame reception of the AP in the first subchannel and the second subchannel.

The frame transmission and reception of one or more stations operating in the first subchannel may be independent from frame transmission and reception of one or more stations operating in the second subchannel.

The plurality of subchannels may be simultaneously accessed by a plurality of stations, respectively, to transmit or receive a spatially multiplexed frame.

In another aspect of the present invention, there is provided a channel access method in a wireless local area network (WLAN) system using a multi-channel configured by aggregation of a plurality of subchannels. The method includes transmitting operating in a first subchannel constituting the multi-channel a traffic information frame for reporting a traffic load to be transmitted to an access point (AP), receiving from the AP a multi-channel switching response frame including information indicating a target subchannel to which the first station switches in response to the traffic information frame, and transmitting or receiving a frame by switching to the target subchannel.

Advantageous Effects of Invention

According to the present invention, a channel access method using a multi-channel is provided. The multi-channel is obtained by aggregation of a plurality of subchannels. Thus, efficiency of media access control (MAC) can be increased, and an implementation cost of stations can be decreased.

MODE FOR THE INVENTION

Hereinafter, exemplary embodiments of the present invention will be described in detail with reference to the accompanying drawings.

Exemplary embodiments described below can effectively apply to a case where a plurality of stations (STAs) transmit frames by simultaneously accessing a channel in a very high throughout (VHT) wireless local area network (WLAN) system that operates in a frequency band of below 6 GHz. Although the VHT WLAN system is exemplified in the following description, the present invention is not limited thereto. Technical features of the present invention described below can also equally apply to a wireless communication system in which a plurality of STAs transmit/receive frames by accessing a multi-channel obtained by aggregation of subchannels irrespective of frequency bands in use.

Figure 1:
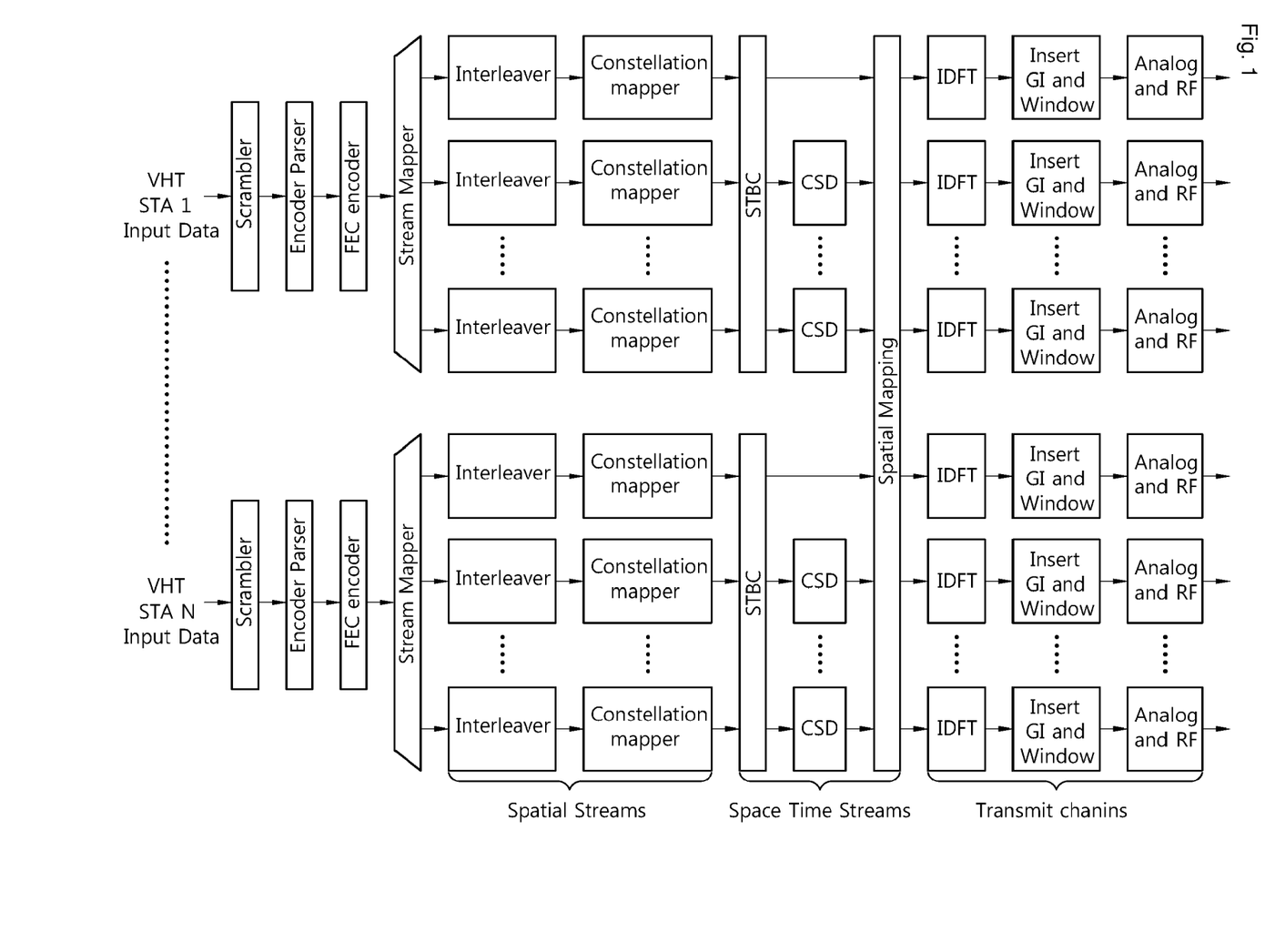
FIG. 1 is a block diagram showing an example of a transmitter usable in a very high throughout (VHT) wireless local area network (WLAN) system.

FIG. 1 is a block diagram showing an example of a transmitter usable in a VHT WLAN system.

In the VHT WLAN system, n STAs, i.e., STA 1, . . . , STA N, may simultaneously access to a channel to transmit spatially multiplexed frames to a receiving STA. The receiving STA may be an access point (AP). In a physical layer (PHY) of an individual STA for transmitting frames, a spatially multiplexed frame is transmitted through multiple antennas according to the procedure of FIG. 1. When one STA uses m spatial streams, at least m radio frequency (RF) units are required. When each of N STAs intend to transmit frames through the m spatial streams, at least M(N RF units are required.

The present invention proposes a frame transmission method of STAs when the plurality of STAs simultaneously access a channel to transmit frames. In this case, the channel used by the plurality of STAs may have a bandwidth of 80 MHz. The bandwidth of 80 MHz may be obtained by aggregating several contiguous subchannels in a non-contiguous manner. It is assumed in the embodiment described below that the channel consists of two subchannels. Although the two subchannels are non-contiguous to each other, each subchannel is contiguous. Such a channel configuration is for exemplary purposes only, and thus the present invention is limited neither to the number of subchannels nor to whether the subchannels are contiguous to each other.

Figure 2:
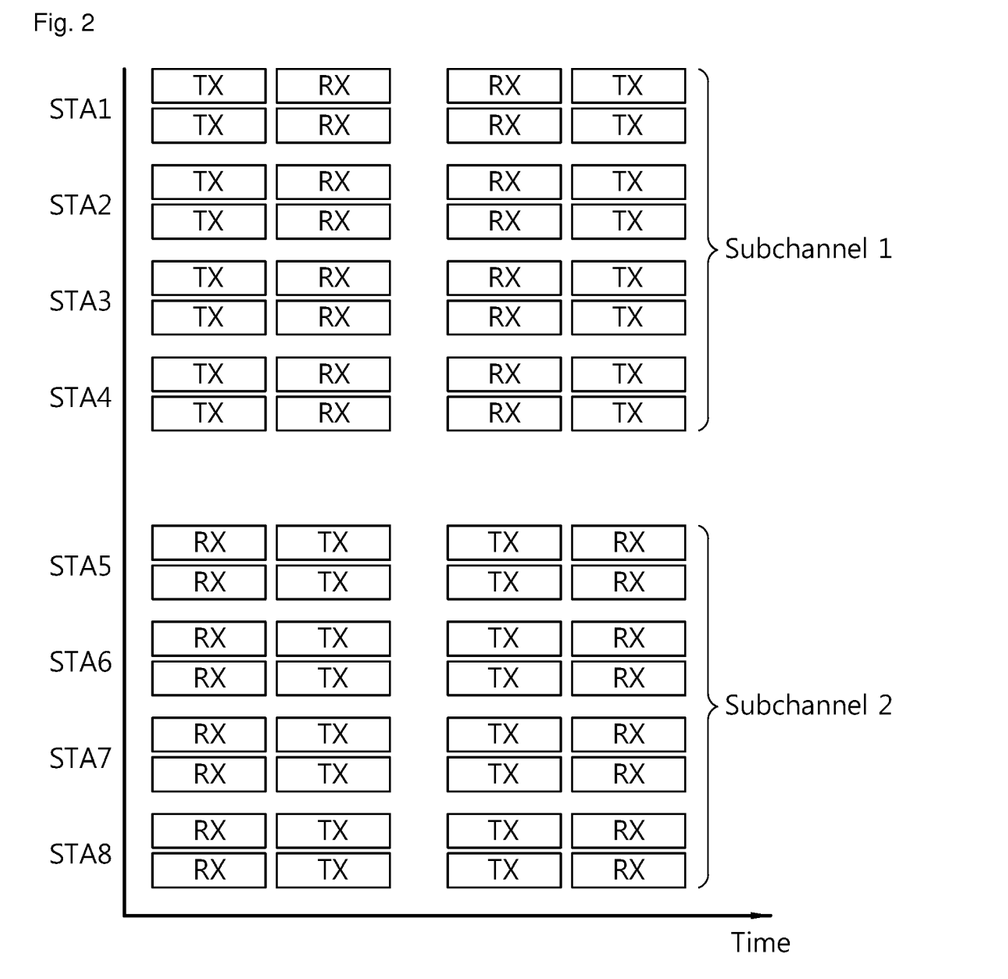
FIG. 2 shows an example of a channel access and frame transmission method according to an embodiment of the present invention.

FIG. 2 shows an example of a channel access and frame transmission method according to an embodiment of the present invention.

It is assumed in FIG. 2 that 8 STAs simultaneously access a channel to transmit/receive frames. The channel used by the STAs is obtained by aggregation of subchannels. Although a subchannel 1 and a subchannel 2 are contiguous to each other herein, the subchannel 1 and the subchannel 2 may be non-contiguous to each other. The number of STAs simultaneously accessing the channel to transmit/receive the frames and the number of spatial streams may increase or decrease within a range of an available PHY interface of a transmitting STA and a receiving STA. Although it is assumed in the present embodiment that a bandwidth of subchannel is 40 MHz and the number of subchannels is 2, this is for exemplary purposes only. Thus, the bandwidth and the number of subchannels may change variously according to a channel environment.

In the exemplary method of FIG. 2 in which frames are transmitted through a multi-channel, the STAs 1 to 8 simultaneously access the channel to transmit/receive the frames by synchronizing a transmission time and a reception time. In the exemplary method of FIG. 2, the subchannel 1 and the subchannel 2 have different transmission/reception modes in the same time period. When the STAs 1 to 4 for transmitting/receiving frames through the subchannel 1 transmit the frames (indicated by Tx in FIG. 2), the STAs 5 to 8 for transmitting/receiving frames through the subchannel 2 receive the frames (indicate by Rx in FIG. 2). Such a frame transmission/reception method using a multi-channel will be hereinafter referred to as a frequency division duplex (FDD) mode.

When using the FDD mode, a transmit (Tx) RF chain and a receive (Rx) RF chain can be simultaneously used, and thus there is an advantage in that utilization of interface resources is optimized. In the example of FIG. 2, each subchannel transmits 8 spatial streams, and as a result, a total of 16 spatial streams are transmitted or received through the entire channels. If one spatial stream supports 150 Mbps under the assumption that each subchannel has a bandwidth of 40 MHz and uses 802.11n PHY, then a peak PHY rate of 2.4 Gbps can be obtained.

Figure 3:
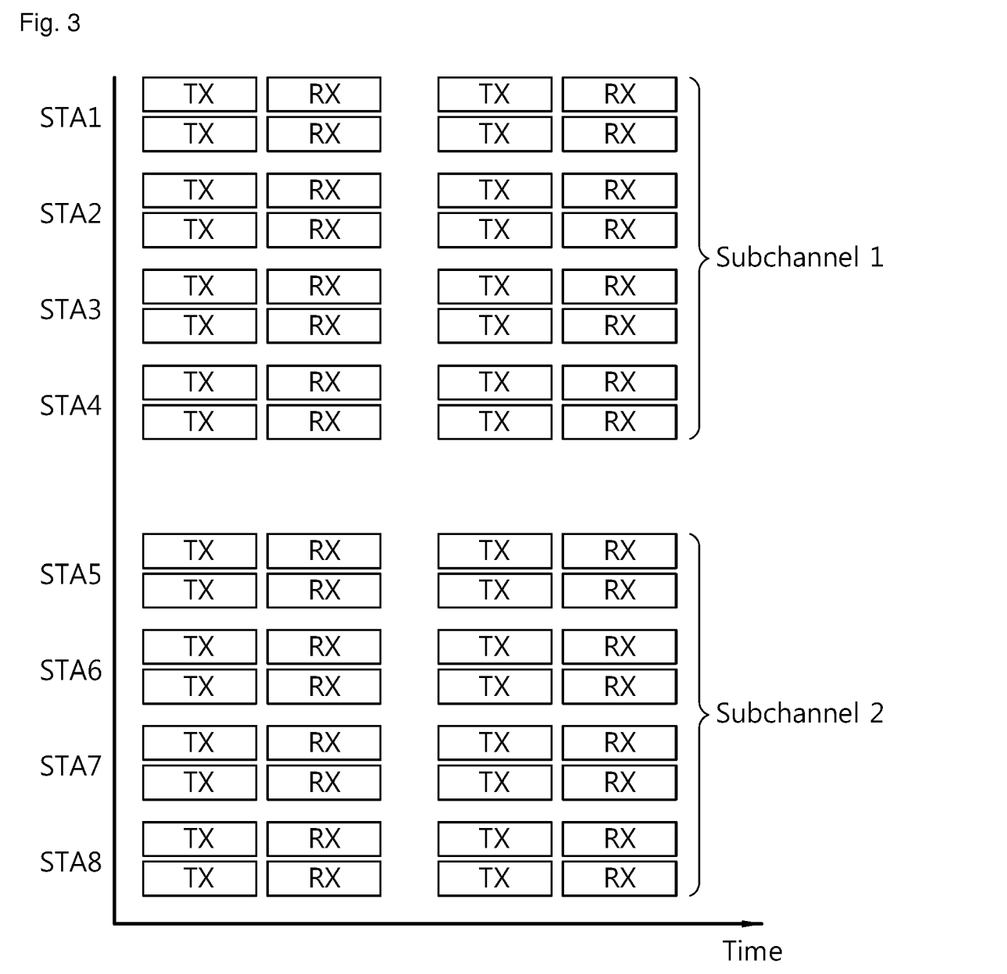
FIG. 3 shows an example of a channel access and frame transmission method according to another embodiment of the present invention.

FIG. 3 shows an example of a channel access and frame transmission method according to another embodiment of the present invention.

In a frame transmission/reception method of FIG. 3, the same Tx/Rx mode is used in the same time period for each subchannel. When an STA for transmitting/receiving a frame through a subchannel 1 is in the Tx mode (i.e., when the frame is transmitted), an STA for transmitting/receiving a frame through a subchannel 2 operates in the Tx mode (i.e., the frame is transmitted). Hereinafter, such a frame transmission/reception method using a multi-channel is referred to as a time division duplex (TDD) mode.

When using the TDD mode, there is an advantage in that the FDD mode can be easily implemented. However, in order to obtain a peak PHY rate of 2.4 Gbps, which is obtained in the FDD mode of FIG. 2 in the same channel/STA configuration and transmission environment assumed in the example of FIG. 2, 16 Tx RF chains and 16 Rx RF chains are required. In other words, the number of analog and RF modules required for implementation of the same performance as in the FDD mode increases by two-fold and thus an implementation cost also increases to that extent.

Figure 4:
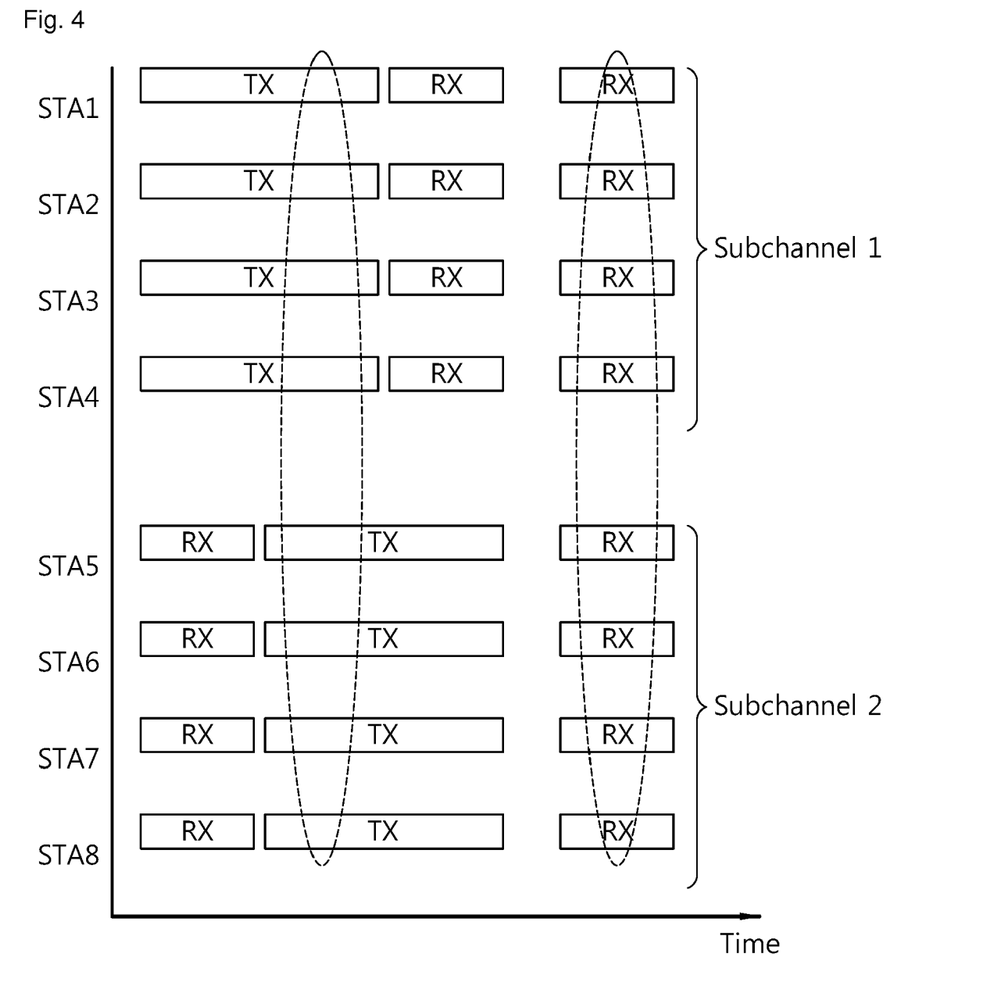
FIG. 4 shows an example of a channel access and frame transmission method according to another embodiment of the present invention.

FIG. 4 shows an example of a channel access and frame transmission method according to another embodiment of the present invention.

The transmission method of FIG. 4 is characterized in that transmission and reception of an STA for transmitting/receiving a frame through a subchannel 1 and a subchannel 2 are performed independently. In other words, a transmission/reception time of an STA for performing transmission/reception through the subchannel 1 and a transmission/reception time of an STA for performing transmission/reception through the subchannel 2 are not synchronized, and transmission/reception is performed independently. Such a frame transmission method will be referred to as an asynchronous multi-channel frame transmission method.

In the asynchronous multi-channel frame transmission method, an AP does not perform a synchronization process between subchannels. Since the synchronization process is skipped, an implementation cost can be reduced. However, there is a problem in that performance deteriorates in comparison with the synchronized multi-channel frame transmission method exemplified in FIG. 2 and FIG. 3.

In the example of FIG. 4, an asynchronous multi-channel frame is transmitted by using 8 Tx RF chains and 8 Rx RF chains. In this case, for each of the subchannel 1 and the subchannel 2, 4 Tx RF chains and 4 Rx RF chains have to be dedicated for transmission and reception. This is to support switching of transmission/reception between a transmitting STA and a receiving STA in a specific subchannel. For example, assume that the AP transmits a frame to STA(s) of the subchannel 1 by using 4 spatial streams through the subchannel 1. In this case, there may be a situation where a control frame such as a block acknowledge (ACK) needs to be received from the STA(s) which receives the frame. However, if an STA operating in the subchannel 2 is currently transmitting 8 spatial streams to the AP, there is a problem in that the AP cannot receive a frame to be received (i.e., the block ACK frame in the above example) since the AP has no available Rx RF chain. Therefore, in order to perform transmission/reception independently between the subchannels, a specific number of Tx/Rx RF chains have to be dedicated for transmission/reception for each subchannel. If a specific number of Tx/Rx RF chains are dedicated for transmission/reception for each channel, resource utility of the dedicated Tx/Rx chain deteriorates.

Under the assumption that each subchannel has a bandwidth of 40 MHZ and IEEE 802.11n PHY is used as shown in FIG. 2, a peak PHY rate may be 1 Gbps in case of using the transmission method of FIG. 4 since 8 spatial streams can be simultaneously transmitted, which is only 50% of the peak PHY rate used in the FDD mode of FIG. 2.

In order to provide the same performance as the transmission method in the FDD mode of the transmission method of FIG. 4, the AP must have 16 Tx/Rx RF chains.

Figure 5:
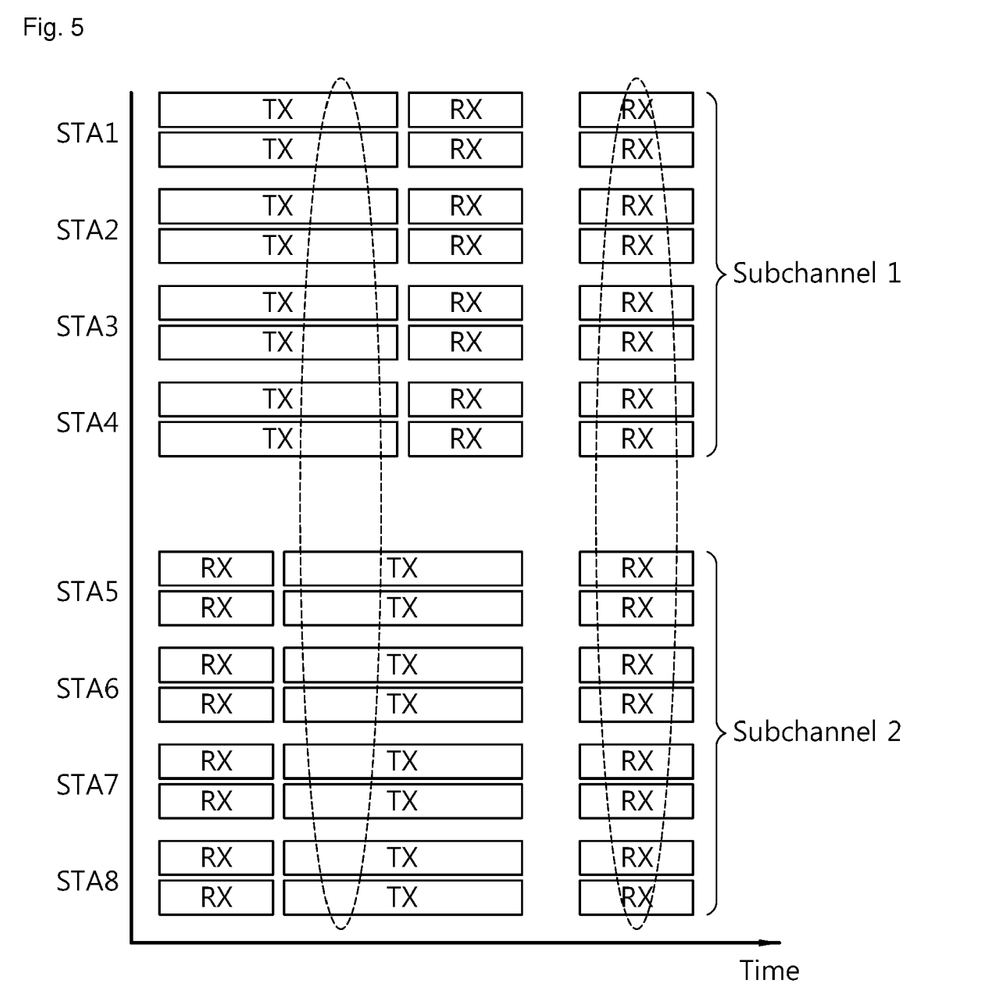
FIG. 5 shows an example of frame transmission when an access point (AP) has 16 transmit (Tx)/receive (Rx) radio frequency (RF) chains in a channel access and frame transmission method of FIG. 4.

FIG. 5 shows an example of frame transmission when an AP has 16 Tx/Rx RF chains in the channel access and frame transmission method of FIG. 4.

Referring to FIG. 5, when the AP has 16 Tx/Rx RF chains in the transmission method of FIG. 4, 16 spatial streams can be simultaneously transmitted/received and thus a peak PHY rate of 2.4 Gbps can be obtained.

Figure 6:
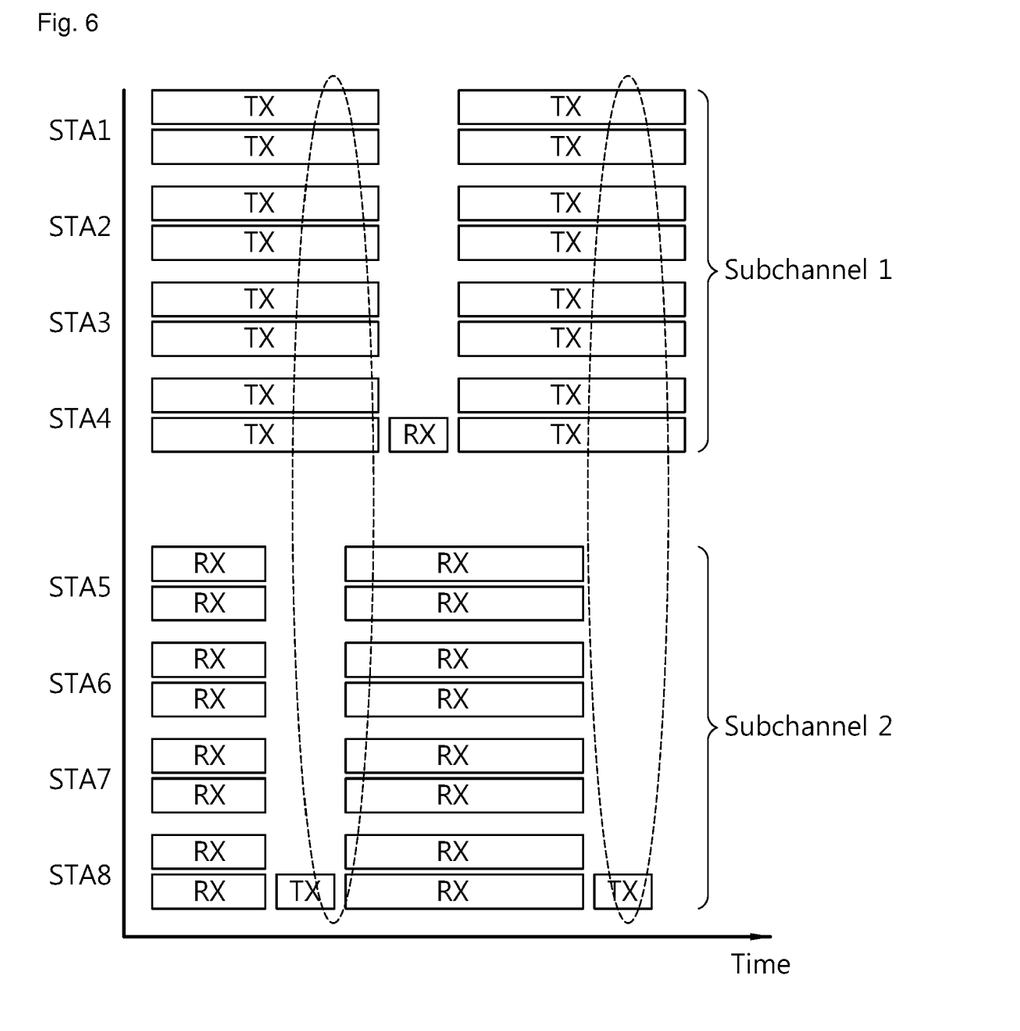
FIG. 6 shows an example of a frame transmission method according to another embodiment of the present invention.

FIG. 6 shows an example of a frame transmission method according to another embodiment of the present invention.

The channel access and frame transmission method of FIG. 6 is an asynchronous frame transmission method in which an STA for transmitting/receiving a frame through a subchannel 1 and an STA for transmitting/receiving a frame through a subchannel 2 perform transmission/reception independently as in the transmission method of FIG. 5. In this case, the number of Tx RF chains dedicated for transmission and the number of Rx RF chains dedicated for reception are set differently in each subchannel when using the multi-channel frame transmission method of FIG. 6. Such a multi-channel frame transmission method will be referred to as an asymmetric multi-channel frame transmission method.

Although it is described in the example of FIG. 6 that the subchannel 1 is set to use 7 Tx RF chains and 1 Rx RF chain, and the subchannel 2 is set to use 1 Tx RF chain and 7 Rx RF chains, this is for exemplary purposes only. Thus, these numbers may be regulated within the range of the maximum number of supportable Tx/Rx RF chains according to a channel environment, an amount of traffic to be transmitted/received by the AP, a traffic priority, etc. The reason of setting the Tx RF chain and the Rx RF chain differently for each subchannel is to optimize a dedicated RF chain to improve RF chain resource utility and frame transmission efficiency.

In FIG. 6, up to 14 spatial streams can be transmitted simultaneously, which implies that a peak PHY rate is 2.1 Gbps. In the subchannel 1, a frame is transmitted by using 7 Tx RF chains and is received by using 1 Rx RF chain. In the subchannel 2, a frame is received by using 7 Rx RF chains and is transmitted by using 1 Tx RF chain. From the perspective of the STA, if frame transmission to the AP is defined as uplink transmission and frame reception from the AP is defined as downlink reception, it can be said that each subchannel has a different uplink/downlink throughput ratio in the asynchronous multi-channel frame transmission method.

The subchannel 1 transmits a frame through the 7 Tx RF chains to the AP and receives a frame from the AP through the 1 Rx RF chain. For example, the frame received from the AP through the Rx RF chain may be an ACK frame for the frame transmitted through the 7 Tx RF chains. It is based on a characteristic in which a control frame has a relatively small size and an overhead is relatively low in comparison with data transmission.

In the asynchronous multi-channel frame transmission method of FIG. 6 according to the embodiment of the present invention, the peak PHY rate may be 2.1 Gbps, whereas an average PHY rate is determined according to an uplink/downlink traffic load for each subchannel. If downlink traffic is concentrated in the subchannel 1 in which an uplink PHY rate is relatively higher than a downlink PHY rate, a spectrum efficiency of the subchannel 1 decreases. Likewise, if uplink traffic is concentrated in the subchannel 2, a spectrum efficiency of the subchannel 2 decreases. In order to increase the spectrum efficiency in the asynchronous multi-channel frame transmission method, the AP needs to regulate a subchannel to be used by a corresponding STA for frame transmission according to a traffic load of the STA. For example, if an STA 7 operating in the subchannel 2 has a large amount of uplink traffic, the spectrum efficiency may increase by performing regulation so that the STA operates in the subchannel 1.

In order for the AP to regulate a subchannel to be used by an STA, information on traffic of the STA needs to be obtained. For this, the AP receives from the STA the information on traffic of the STA. The AP allocates/transmits a subchannel suitable for the STA on the basis of the received traffic information. The STA receiving subchannel information from the AP can transmit/receive a frame by switching (or transferring) to a corresponding subchannel. Transmission/response of the information on the traffic of the STA may be achieved using the conventional management action frame, or an additional new frame for transmission/response may be defined and used.

Figure 7:
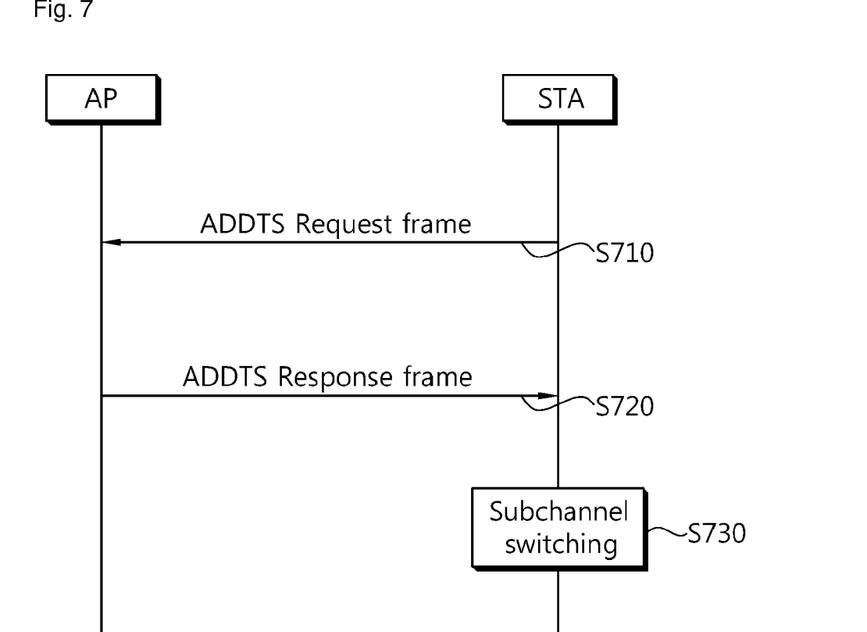
FIG. 7 shows an example of exchanging traffic information and subchannel information between an AP and a station (STA) according to an embodiment of the present invention.

FIG. 7 shows an example of exchanging traffic information and subchannel information between an AP and an STA according to an embodiment of the present invention. The example of FIG. 7 uses the management action frame defined in the IEEE 802.11 standard. The STA transmits an add traffic stream (ADDTS) request frame to the AP (step S710). The ADDTS request frame is a management frame used to carry traffic specification (TSPEC). In this case, the STA may transmit traffic information to the AP as a TSPEC information element of the ADDTS request frame.

Upon receiving the ADDTS request frame, the AP transmits an ADDTS response frame in response thereto (step S720). In this case, the ADDTS response frame according to the embodiment of the present invention further includes multi-channel switch announcement information. The multi-channel switch announcement information indicates a subchannel to which the STA receiving the information switches.

Upon receiving the ADDTS response frame, the STA may transmit/receive a frame by switching to a subchannel indicated by multi-channel switch announcement information.

More specifically, in the example of FIG. 6, assume that the STA 7 operating in the subchannel 2 transmits to the AP the ADDTS request frame including traffic information of the STA 7, and the STA 7 has a larger amount of uplink traffic. In this case, the AP configures the multi-channel switch announcement information so that the STA 7 operates by switching to the subchannel 1, and transmits the configured information to the STA 7 by using the ADDTS response frame. Upon receiving the ADDTS response frame, the STA 7 may switch to the subchannel 1 to operate in the subchannel 1.

Figure 8:
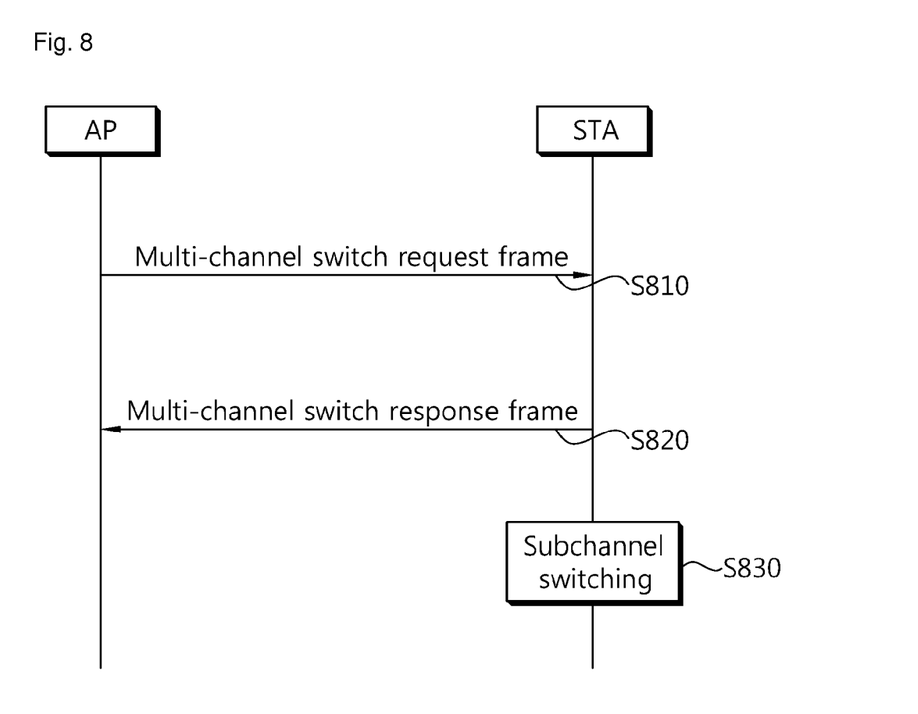
FIG. 8 shows another example of exchanging traffic information and subchannel information between an AP and an STA according to an embodiment of the present invention.

FIG. 8 shows another example of exchanging traffic information and subchannel information between an AP and an STA according to an embodiment of the present invention. Unlike in the example of FIG. 7, the STA does not transmit its traffic information to the AP. In this case, the AP may request a specific STA to perform subchannel switching.

The AP transmits to the specific STA a multi-channel switch request frame for requesting switching from a current subchannel to another subchannel (step S810). The multi-channel switch request frame includes information indicating a subchannel to which the STA receiving the frame switches.

Upon receiving the multi-channel switch request frame, in response thereto, the AP transmits a multi-channel switch response frame to the AP to indicate whether to access or deny the subchannel switching request (step S820).

If the STA accepts the subchannel switching request, switching is performed according to information which is included in the multi-channel switch request frame and which indicates a subchannel to which switching is to be made (step S830).

The multi-channel switch request frame according to the embodiment of the present invention differs from the channel switch announcement frame defined in the IEEE 802.11 standard. The conventional channel switch announcement frame is a frame used to report channel switching to all STAs connected to the AP when the AP switches a channel currently used by the AP to another channel. On the contrary, the multi-channel switch request frame according to the embodiment of the present invention is a frame used when the AP uses/supports all subchannels and allows only a specific STA to switch from a subchannel currently used by the specific STA to another subchannel without having to switch the channel currently used by the AP.

In case of the STA 4 of FIG. 6, the AP may transmit to the STA 4 a multi-channel switch request frame for requesting the STA 4 to switch to the subchannel 4 when a large amount of traffic needs to be transmitted to the STA 4. The STA 4 determines whether to switch to the subchannel 2 and transmits a multi-channel switch response frame to the AP. If the STA 4 accepts a subchannel switching request, the STA 4 switches to the subchannel 2 and then can transmit/receive a frame by using the subchannel 2.

Table 1 shows an example of the multi-channel switch request frame.

TABLE 1

| Order | Information |
| --- | --- |
| 1 | Category |
| 2 | Action |
| 3 | Dialog Token |
| 4 | Target Primary Channel |
| 5 | Target Secondary Channel Offset |
| 6 | Target Extension Channel Offset |

The multi-channel switch request frame includes information on a target channel, i.e., a subchannel to which an STA switches. The target channel may consist of a target primary channel, a target secondary channel offset, and a target extension channel offset as shown in Table 1. If the STA uses a band of 20 MHz, transmission is performed by setting only the target primary channel. If the STA uses a band of 40 MHz, the target primary channel and the target secondary channel offset are set. If the STA uses a band of 80 MHz, the target primary channel, the target secondary channel offset, and the target extension channel offset are all set.

Table 2 shows an example of the multi-channel switch response frame.

TABLE 2

| Order | Information |
| --- | --- |
| 1 | Category |
| 2 | Action |
| 3 | Dialog Token |
| 4 | Status Code |
| 5 | Multi-channel Switch Timing |

The multi-channel switch response frame includes information indicating whether the STA will accept the subchannel switch request, and it is set in a status code in Table 2. Multi-channel switching timing indicates timeout information for determining a time at which the STA switches to a target channel.

Figure 9:
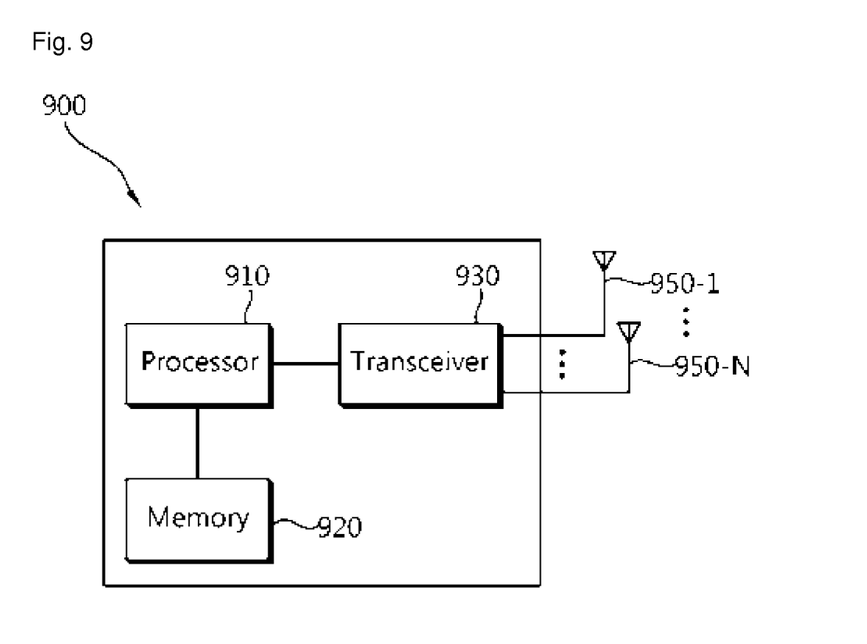
FIG. 9 is a block diagram showing an exemplary wireless apparatus for implementing an embodiment of the present invention.

FIG. 9 is a block diagram showing an exemplary wireless apparatus for implementing an embodiment of the present invention. A wireless apparatus 900 may be an AP or a non-AP STA.

A wireless apparatus 900 includes a processor 910, a memory 920, a transceiver 930, and N antennas 950-1, . . . , 950-N. The transceiver 930 transmits/receives a radio signal, and implements an IEEE 802.11 PHY layer. The transceiver 930 supports MIMO transmission by using the N antennas 950-1, . . . , 950-N. The processor 910 is coupled to the transceiver 903, and implements IEEE 802.11 MAC and PHY layers. When the processor 910 processes an operation of the AP in the aforementioned method, the wireless apparatus 900 is the AP. When the processor 910 processes an operation of the STA in the aforementioned method, the wireless apparatus 900 is the STA.

The wireless apparatus's MAC layer implemented by the processor 910 supports the aforementioned multi-channel frame transmission method, generates a management frame necessary for implementation of the aforementioned asymmetric multichannel frame transmission method, and transmits the generated management frame to the transceiver 930 via a physical layer convergence protocol (PLCP) layer and a physical medium dependent (PMD) layer. The MAC and PHY layers supporting the multichannel frame transmission of the present invention can be implemented in the processor by modularizing each layer.

The processor 910 and/or the transceiver 930 may include an application-specific integrated circuit (ASIC), a separate chipset, a logic circuit, a data processing unit, and/or a radio frequency (RF) unit for mutually converting a baseband signal and a radio signal. The memory 920 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 920 and may be performed by the processor 910. The memory 920 may be located inside or outside the processor 910, and may be coupled to the processor 910 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method for a wireless local area network (WLAN) system using a plurality of frequency subchannels, the method comprising:
    transmitting, by a requesting station to a responding station, an add traffic stream (ADDTS) request frame through a first subchannel of the plurality of frequency subchannels, the ADDTS request frame including a traffic specification (TSPEC) element including quality of service (QoS) parameters of a traffic stream;
    receiving, by the requesting station from the responding station, an ADDTS response frame in response to the ADDTS request frame through the first subchannel of the plurality of frequency subchannels,
    wherein the ADDTS response frame includes a status code, time information and a multi-channel element,
    wherein the status code indicates a success of a request by the ADDTS request frame,
    wherein the time information indicates when a service for the traffic stream identified by the TSPEC element in the ADDTS request frame starts,
    wherein the multi-channel element indicates a second subchannel of the plurality of frequency subchannels to which the traffic stream identified by the TSPEC element in the ADDTS request frame applies and on which the responding station intends to operate, and
    wherein the multi-channel element is set to a first value to indicate that the second subchannel includes all of the plurality of frequency subchannels, or the multi-channel element is set to a second value to indicate that the second subchannel includes one of the plurality of frequency subchannels;
    switching, by the requesting station, an operating channel from the first subchannel to the second subchannel; and
    transmitting, by the requesting station to the responding station, at least one data frame with the traffic stream identified by the TSPEC element at a time indicated by the time information through the second subchannel indicated by the multi-channel element.

2. The method of claim 1, wherein the responding station is an access point (AP) and the requesting station is a non-AP station.

3. A device for a wireless local area network (WLAN) system using a plurality of frequency subchannels, the device comprising:
- a transceiver configured to receive and transmit radio signals; and
- a processor operatively coupled with the transceiver and configured to:
    - transmit, via the transceiver to a responding station, an add traffic stream (ADDTS) request frame through a first subchannel of the plurality of frequency subchannels, the ADDTS request frame including a traffic specification (TSPEC) element including quality of service (QoS) parameters of a traffic stream;
    - receive, via the transceiver from the responding station, an ADDTS response frame in response to the ADDTS request frame through the first subchannel of the plurality of frequency subchannels,
    - wherein the ADDTS response frame includes a status code, time information and a multi-channel element,
    - wherein the status code indicates a success of a request by the ADDTS request frame,
    - wherein the time information indicates when a service for the traffic stream identified by the TSPEC element in the ADDTS request frame starts,
    - wherein the multi-channel element indicates a second subchannel of the plurality of frequency subchannels to which the traffic stream identified by the TSPEC element in the ADDDTS request frame applies and on which the responding station intends to operate, and
    - wherein the multi-channel element is set to a first value to indicate that the second subchannel includes all of the plurality of frequency subchannels, or the multi-channel element is set to a second value to indicate that the second subchannel includes one of the plurality of frequency subchannels;
    - switch an operating channel from the first subchannel to the second subchannel; and
    - transmit, via the transceiver to the responding station, at least one data frame with the traffic stream identified by the TSPEC element at a time indicated by the time information through the second subchannel indicated by the multi-channel element.

4. A method for a wireless local area network (WLAN) system using a plurality of frequency subchannels, the method comprising:
- receiving, by a responding station, an add traffic stream (ADDTS) request frame to set up traffic streams from a requesting station through a first subchannel of the plurality of frequency subchannels, the ADDTS request frame including a traffic specification (TSPEC) element including quality of service (QoS) parameters of a traffic stream;
- transmitting, by the responding station to the requesting station, an ADDTS response frame in response to the ADDTS request frame through the first subchannel of the plurality of frequency subchannels,
- wherein the ADDTS response frame includes a status code, time information and a multi-channel element,
- wherein the status code indicates a success of a request by the ADDTS request frame,
- wherein the time information indicates when a service for the traffic stream identified by the TSPEC element in the ADDTS request frame starts,
- wherein the multi-channel element indicates a second subchannel of the plurality of frequency subchannels to which the traffic stream identified by the TSPEC element in the ADDDTS request frame applies and on which the responding station intends to operate, and
- wherein the multi-channel element is set to a first value to indicate that the second subchannel includes all of the plurality of frequency subchannels, or the multi-channel element is set to a second value to indicate that the second subchannel includes one of the plurality of frequency subchannels;
- switching, by the responding station, an operating channel from the first subchannel to the second subchannel; and
- receiving, by the responding station from the requesting station, at least one data frame with the traffic stream identified by the TSPEC element at a time indicated by the time information through the second subchannel indicated by the multi-channel element.

5. The method of claim 1, wherein each of the plurality of frequency subchannels has a bandwidth of 20 MHz, 40 MHz or 80 MHz.

6. The device of claim 3, wherein the responding station is an access point (AP) and the device is a non-AP station.

7. The method of claim 4, wherein the responding station is an access point (AP) and the requesting station is a non-AP station.

8. The device of claim 3, wherein each of the plurality of frequency subchannels has a bandwidth of 20 MHz, 40 MHz or 80 MHz.

9. The method of claim 4, wherein each of the plurality of frequency subchannels has a bandwidth of 20 MHz, 40 MHz or 80 MHz.

* * * * *